Figure 1:
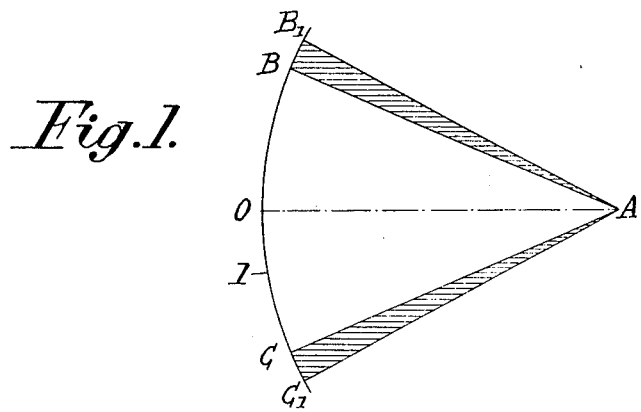

May 31, 1966     J. H. F. CHIBRET     3,254,000
FERMENTATION METHOD FOR OBTAINING ANTHOCYANIDIN
GLUCOSIDES FROM BERRY JUICE
Filed Aug. 22, 1963

United States Patent Office 3,254,000
Patented May 31, 1966

3,254,000
FERMENTATION METHOD FOR OBTAINING ANTHOCYANIDIN GLUCOSIDES FROM BERRY JUICE
Jean Henri Francois Chibret, Clermont-Ferrand (Puy-de-Dome), France, assignor to Laboratoires Chibret, Clermont-Ferrand (Puy-de-Dome), France, a society of France
Filed Aug. 22, 1963, Ser. No. 303,789
Claims priority, application France, Apr. 18, 1961, 859,092, 859,093; Mar. 22, 1962, 891,934; Aug. 9, 1963, 944,336
6 Claims. (Cl. 195—2)

This is a continuation-in-part of application Ser. No. 186,855 now abandoned, filed April 12, 1962.

The present invention relates to therapeutic products for improving visual acuity, and especially for night vision. The invention is also concerned with methods of obtaining such products.

The new products according to the present invention consist in anthocyanidin glucosides obtained from berries of the group consisting of bilberries, black currants and blackberries.

The method for obtaining these products consists essentially in subjecting juices or extracts of said berries to fermentation by means of suitable yeast, preferably lyophilized and preliminarily acclimatized to the components of the bodies containing the glucosides to be separated, this yeast causing fermentation of the sugars, whereas it leaves the glucosides untouched so that it is then possible to extract them.

According to another feature of this invention, extraction of the glucosides is obtained by a separation by means of alcohol, in particular to dissolve the free anthocyanidins whereas the glucosides are not dissolved.

It has been found that anthocyanidin glucosides obtained from bilberries, black currants and blackberries have remarkable effects upon visual acuity. Furthermore they have a great activity as vitamin P.

The products according to the present invention are characterized by a combination of sugars with bodies of different chemical natures such as alcohols, phenols. Their general formula is as follows:

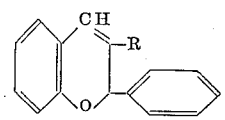

where R designates the sugar in the combination.

In order to obtain these glucosides, use is made of the method which will now be described.

If it is desired for instance to obtain the anthocyanidin glucosides from juice or extract of bilberry (*Vaccinium myrtillus*), use is made of the action of yeasts and account is taken, in the final separation, of the fact that glucosides, in natural substances, are generally accompanied by free aglycons or anthocyanidins (deriving from the glucosides by cancellation of sugar R in the above formula) which must be eliminated.

It will be remainded that the starting material, or extract of bilberries, contains, in addition to glucosides and free anthocyanidins, the following substances:

free, i.e., fermentable sugar in important quantity, mineral salts, organic acids, resins, and possibly other impurities.

Starting from such an extract of bilberries, obtained for instance by concentration in a vacuum, free sugar is eliminated during a first step.

For this purpose this extract is subjected to a fermentation intended to eliminate free sugars without touching glucosides.

This fermentation is produced by means of lyophilized yeasts which have been preliminarily activated and acclimatized to the above mentioned glucosides.

The lyophilized yeasts which, as it is known, are obtained by freezing at low temperature and ice sublimation, are for instance those supplied by the Pasteur Institute (in particular of the *Saccharomices oviformis* type or of the *Saccharomices cerevisiae*, Ellipsoideus variety), and activated in the following manner:

These yeasts are placed in suspension for several days in a solution of saccharose, according to the indications of the Pasteur Institute. When fermentation is nearly finished, the yeast is acclimatized to the glucosides to be treated by incorporating into this suspension a small amount $q$ of the bilberry extract to be treated, this proportion being for instance $1/25$ of the total amount $Q$ to be treated. The temperature should be kept at a value ranging approximately from 22 to 25° C.

This suspension, thus completed, is left in darkness for three of four days, and is stirred each day. The suspension is then ready for the fermentation treatment.

For this treatment, which is intended to eliminate sugars by fermentation, the yeast suspension is mixed with the amount $Q$ of bilberry extract in about five times its weight of water and the treatment is performed for a suitable time, ranging for instance from 12 to 15 days, under partial aerobiosis conditions.

Fermentation produces, by transformation of the sugars, alcohol and $CO_2$ which disengages. This disengagement interferes with the development of the yeast, so that it is of interest to remove the gas. But this should not be done in such manner as to produce total aerobiosis because this would then produce an excessive development of the yeast at the expense of the formation of alcohol and, furthermore, with secondary fermentations.

It seems that a good result is obtained by partly eliminating $CO_2$ on every second or third day, by evacuation of the atmosphere existing in the treatment vessel or by blowing a stream of air into said vessel. Furthermore, stirring may be effected either in a continuous manner or merely one or several times every day.

The fermentation treatment being finished, it is then necessary to filter, for instance in a press-filter, (discs of cellulose or of paper) to eliminate the yeasts and also the impurities which may have been dissolved owing to the presence of the sugars. An evaporation is then effected in a limited vacuum, so as never to exceed the temperature of 50° C., whereby a residue is obtained, which contains the anthocyanidin glucosides, since these substances do not undergo fermentation.

If necessary, in order to make sure that fermentation is truly finished, yeast may be reintroduced into said residue. No production of alcohol nor any disengagement of $CO_2$ should then take place.

The residue then obtained contains practically all the substances of the starting material with the exception of the free sugars and of the products eliminated by filtration.

The second step of the method will now consist in extracting the anthocyanidin glucosides from said residue by making use of the fact that anthocyanidin glucosides are very slightly soluble in alcohol whereas the other substances (free anthocyanidins, organic acids, and most of the resins) are soluble therein.

To perform this extraction, the residue is first dried, preferably in a phosphoric vacuum, and it is then treated with boiling ethyl alcohol so that the above mentioned foreign bodies are dissolved. When cooling down, the anthocyanidin glucosides separate and are collected by filtration. The operation is repeated several times if necessary until an alcohol solution is obtained which is but very slightly colored. As a matter of fact, during the first operation, some coloration is observed, due to the presence of free anthocyanidins. This coloration decreases gradually during the following operations, which shows that said free anthocyanidins are eliminated.

If necessary the product might be treated with ethyl acetate for a supplementary purification, the desired anthocyanidin glucosides being soluble in this acetate.

Supposing that the purification by means of cooled alcohol is considered as sufficient, the insoluble residue that is obtained, which contains the above mentioned glucosides, may be treated in water, after which the solution is filtered. This last operation eliminates the polymers which may have formed during the evaporation of the solution at the end of the fermentation step.

The desired product is finely obtained, i.e. the anthocyanidin glucoside or glucosides extracted from the initial bilberry juice, this product corresponding to the above indicated general formula. By chromatography on unidimensional paper and by making use of a solvent consisting of acetate butanol saturated with water, there is detected a series of dark red spots with a mean RF coefficient of 0.20. Ultra-violet light discloses another series of spots having a mean RF of 0.4.

The method above described for the treatment of bilberries also applies to the treatment of black currants and blackberries, for the obtaining of the product according to the present invention.

It is this product which has remarkable qualities from the point of view of visual acuity.

Said product may be applied to the patient in various ways, for instance, by injection or in the form of tablets or drops.

It seems that excellent results are obtained by administering to the patient (for instance when it is desired temporarily to increase the visual acuity by night) amounts of the product in question averaging 250 mg., in particular in the form of six tablets containing each 40 mg. of the product. The effects are generally observed after one or two hours.

One of the tests for showing the beneficial action of the products according to the present invention upon crepuscular or nocturnal vision was made upon a group of eighteen persons having a normal visual sight, the test consisting of measuring the increase of the visual field after absorbtion of products, each of said persons absorbing 400 mg. of the active product in the form of tablets.

Every person tested was placed in front of a semispherical cupola coated with a dull white picture, said cupola, having a diameter of one meter, being illuminated in an adjustable manner and having at its center 0 a red point.

A luminous spot is moved either from the center of the cupola toward the periphery thereof, or in the reverse direction, and the person undergoing the test having his eye fixed on the red point, indicates when the light spot disappears, in case of its displacement from center 0 toward the periphery (or when it appears if the spot is moving from the periphery toward center 0). This operation is repeated in several directions starting from the center of the cupola so that it is possible to determine the limits of the visual field.

Figure 2:
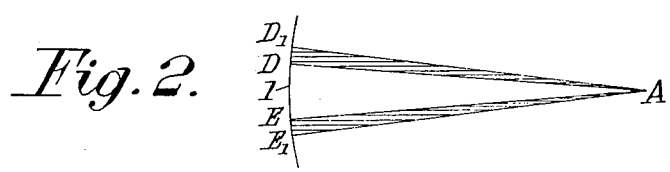

FIGS. 1 and 2 are diametral sections of the cupola and show the modifications of the visual field by crepuscular and nightlight of patients before and after having absorbed the product according to the invention.

The first measurements were made with a luminance of 7.6 picostilbs logarithmic units, such as luminance corresponding to a relatively strong crepuscular light (FIG. 1).

The eye of the rested person being placed at A (FIG. 1) and looking at the center 0 of the cupola 1, the angle BAC indicates, for the group, the average external apex angle out of which the above mentioned spot disappears, thus determining the average external visual field of the eighteen persons of the group at the time they have absorbed the product of the invention. The value of this apex angle was 48°08.

The apex angle $B_1AC_1$ shows said average external apex angle, that is to say the average external visual field of the group four hours later, the value of this last angle having increased since it changes to 50°44'.

These results therefore show a substantial improvement of the external visual field, in crepuscular light, of persons having a normal sight, since it increases from 48°08 to 50°44 four hours after ingestion of the product according to the invention. It should be noted that this improvement is the more remarkable as experience teaches that, without the product, the mean external visual field of the group would have decreased due to fatigue of persons subjected twice in four hours to a tiring examination in a dark chamber.

I also noted a reduction of the blind central spot or central scotoma of the eye under low crepuscular illumination when the product according to my invention was used. As a matter of fact it is known that the central portion of the retina, i.e. the macula, comprises only cones which serve for day vision, and no rods which are the organ of night vision. Said rods exist to a variable degree at a distance from the macula. Due to this formation of the retina, the center thereof is blind at night or with a very low crepuscular illumination.

The eighteen persons of the group above mentioned were examined and it was found that the central scotoma of each of them was reduced after absorption of the product according to the present invention. The measurements were made with the same apparatus as above mentioned and with a low crepuscular illumination 6.6 picostilbs logarithmic units. These results are diagrammatically shown by FIG. 2. Apex angle DAE indicates the average central scotoma of the group when the product was absorbed, whereas apex angle $D_1AE_1$ shows the mean central scotoma of the group four hours after the product was absorbed.

The central scotoma, the field of which corresponded to an apex angle of 13°50, is reduced, four hours after the product was ingested, to 11°04. In this case, also, it should be noted that if the persons examined twice within a time interval of four hours had not absorbed the product according to the invention, the blind spot would have increased.

The following other tests have been made.

By means of the above mentioned apparatus, the following parameters were determined for a great number of patients:

the luminous threshold of retina (TLT),
the local luminous thresholds for several points of the retina (4 central points and 6 peripheral points),
the critical frequency of luminous fusion (CFF).

For every test the patient that was examined was subjected to an adaption of thirty minutes in total darkness.

In a general manner the following results were obtained:

for the TLT, a significant improvement;
for the local luminous threshold, the improvements were also important, both in the central area and in the peripheral area, and
for the CFF a slight improvement.

Here is for instance the result of a particular observation:

The patient was a man of 22 years in perfect state of health having a visual acuity of 10/10 in the daytime.

Three tests were made to determine the three above mentioned parameters; the value of the parameters were noted.

Then the patient was given 6 tablets containing each 40 mg. of the product according to this invention, and remained in a lighted area for one hour.

He was then readapted to darkness and the above mentioned tests were made, first one hour after he had taken the product and two hours after this.

The improvement already found to exist after one hour was substantially increased after two hours.

Merely by way of indication here is a formula for the composition of the tablets:

For one tablet:

| | g. |
|---|---|
| Anthocyanidin glucosides | 0.040 to 0.100 |
| Kieselghur | 0.100 |
| Sugar | 0.040 |
| Talic | 0.015 |
| Starch | 0.015 |
| Magnesium stearate | 0.005 |

The new product obtained according to the invention has an undeniable therapeutic interest whether in the case of normal subjects as seen above or in that of deficient subjects as it will be shown hereinafter.

The product according to the invention has been administered to nineteen persons suffering from hemeralopia (loss, at least partial, of vision by nightlight and crepuscular light). These nineteen persons where separated in three groups, respectively, of four, seven and eight persons.

The eyes of the first group presented only functional deficiencies whereas the eyes of the second one presented also clinical lesions and the eyes of the third group were more severely affected.

In all cases the patients received a daily dose of 200 mg. of the product of the invention and this fifteen days per month and during three months.

I observed a substantial improvement of the crepuscular and night vision for all the patients of the first group, for five patients of the second group and for four persons of the third group. Three persons of the first and second group recovered a full normal vision. Furthermore, these patients after having been dazzled recovered more quickly their night and crepuscular vision. Those who could not drive any more could do it again.

Figure 3:
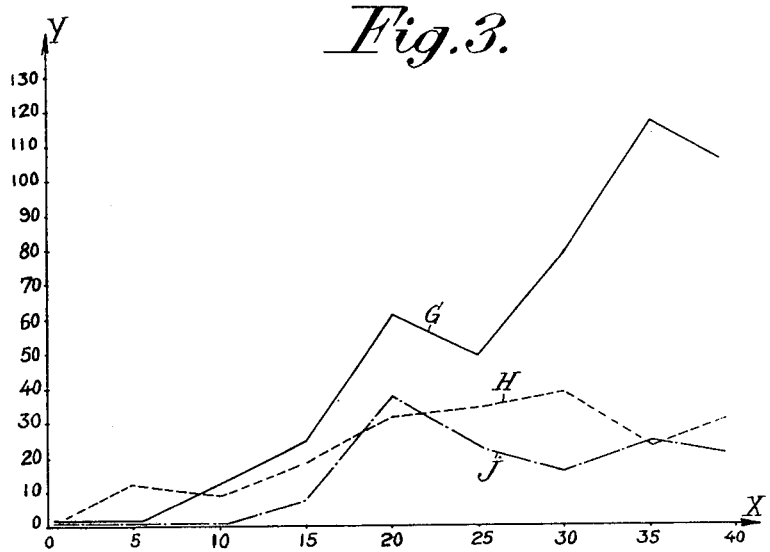

I have further demonstrated that anthocyanidin glucosides have a great activity as vitamin P. It is known that this vitamin exerts a double action upon the capillary system. On the one hand, it increases the capillary resistance, and on the other hand, it reduces the capillary permeability. This reduction of the capillary permeability was brought into evidence, according to the methods of A. M. Ambrose and of F. Eds, J. Pharmacol, 1947, volume 90, page 359 by the following biological tests made on rabbits in good health weighing about 2 kg., the results of which are shown in FIG. 3.

I compared the action of anthocyanidin glucosides with known bodies having a P vitaminic action such as rutoside or aurantiacae flavonoids. There was four groups of ten rabbits, all of which were subjected to treatment, by means of a suitable diet for making the blood capillary vessels brittle. As a matter of fact, they were deprived during four weeks of green provender and they only were fed with moist bran, oats and water.

The first group of ten was a witness or comparison group, whereas the three other groups were treated respectively with anthocyanidin glucosides, rutoside made soluble in water and aurantiacae flavonoids. Said tests consisted in administering to the rabbits in intravenous fashion, 2 ml. of a solution containing 1% of a coloring material known under the name of trypan blue. On the carefully depilated skin of the abdomen were applied cotton pads impregnated with chloroform, for thirty seconds so as to create a local irritation which facilitates the diffusion of the coloring material from the capillary ducts toward the interstitial liquids, so that a blue spot appears at the inflamed points.

The time taken by the blue spot for appearing is increased in the case of rabbits treated with the above mentioned bodies, this increase showing a reduction of the capillary permeability of these rabbits. The mean results for the three groups of rabbits treated respectively with anthocyanidin glucosides, rutosides and aurantiacae flavonoids are illustrated by the curves of FIG. 3. On this figure, I have plotted in abscissas (axis OX) the times in minutes between the injection of trypan blue and the application at a point of the abdomen of the rabbits of the chloroform pad and in ordinates (axis OY), the percentage of increase, in the case of the animals treated with the above mentioned bodies, of the time necessary for the appearance of blue spots on the animals of the witness group. It is observed that the percentage of increase of the time at the end of which the spots appear on the animals is greater in the case of the animals treated with anthocyanidin glucosides (curve G) than in the case of the animals treated with rutoside (curve H) and aurantiacae flavonoids (curve J). Therefore the capillary permeability is more strongly reduced in the case of the animals treated with anthocyanidin glucosides. This body therefore has an effect greater than those of compounds used for similar purposes.

The doses may in a general manner average 400 mg., in particular in the form of tablets containing each 100 mg. of the product.

These anthocyanidin glucosides extracted from bilberries, black currants and blackberries have no toxicity when administered orally. A systematic study of a 50% lethal dose in the case of mice orally according to the method described by Miller and Tainter in "Proceeding to the Society for Experimental Biology and Medicine," 1944, 57, pages 261–264 indicates that this dose is 1.9 gr. per kg. of animal which is therefore considerable.

These products may also be used for any other applications, even outside of therapeutic applications.

Finally, the separation method according to the invention may be used for the separation of glucosides and anthocyanidins other than those above mentioned, the sugars which are generally present in these glucosides being in every case eliminated by a selective fermentation, and this in all cases where fermentation does not touch the glucosides.

What I claim is:

1. A method of obtaining anthocyanidin glucosides which comprises starting from a juice of berries selected from the group consisting of bilberries, black currants and blackberries, subjecting said juice to fermentation by means of a yeast selected from the group consisting of the yeast *Saccharomices oviformis* and of the yeast *Saccharomices cerevisiae* of the Ellipsoïdeus variety, whereby sugars are fermented, filtering the slurry obtained and recovering the clear solution containing the unfermented anthocyanidin glucosides, and extracting the dissolved anthocyanidin glucosides from said clear solution.

2. A method of obtaining anthocyanidin glucosides which comprises starting from a juice of berries selected from the group consisting of bilberries, black currants and blackberries, subjecting said juice to fermentation by means of lyophilized yeast previously accustomed to the glucosides to be prepared, said yeast being selected from the group consisting of the yeast *Saccharomices oviformis* and of the yeast *Saccharomices cerevisiae* of the Ellipsoïdeus variety, whereby sugars are fermented, filtering the slurry obtained and recovering the clear solution containing the unfermented anthocyanidin glucosides, and extracting the dissolved anthocyanidin glucosides from said clear solution.

3. A method of obtaining anthocyanidin glucosides which comprises starting from a juice of berries selected from the group consisting of bilberries, black currants and blackberries, subjecting said juice to fermentation by means of a lyophilized yeast previously accustomed to the glucosides to be prepared, said yeast being selected from the group consisting of the yeast *Saccharomices oviformis* and of the yeast *Saccharomices cerevisiae* of the Elliposoïdeus variety, whereby sugars are fermented, filtering the slurry obtained and recovering the clear solution containing the unfermented anthocyanidin glucosides, evaporating said clear solution under vacuum and under a temperature not exceeding the temperature of 50° C. to obtain a residue and extracting the unfermented glucosides from said residue.

4. A method of obtaining anthocyanidin glucosides which comprises starting from a juice of berries selected from the group consisting of bilberries, black currants and blackberries, subjecting said juice to fermentation by means of a lyophilized yeast previously accustomed to the glucosides to be prepared, said yeast being selected from the group consisting of the yeast *Saccharomices oviformis* and of the yeast *Saccharomices cerevisiae* of the Elliposoïdeus variety, whereby sugars are fermented, filtering the slurry obtained and recovering the clear solution containing the unfermented anthocyanidin glucosides, evaporating said clear solution under vacuum and under a temperature not exceeding the temperature of 50° C. to obtain a residue, boiling said residue with alcohol, cooling and filtering the undissolved glucosides and separating them from the free anthocyanidins, organic acids and resins which remain dissolved in the alcohol.

5. A method according to claim 4 which further comprises treating said glucosides with water and filtering to eliminate polymers as may have formed during the evaporation step.

6. A method of obtaining anthocyanidin glucosides which comprises starting from a juice of bilberries, subjecting said juice to fermentation by means of a lyophilized yeast *Saccharomices oviformis* previously accustomed to the glucosides to be prepared, whereby sugars are fermented, filtering the slurry obtained and recovering the clear solution containing the unfermented anthocyanidin glucosides, evaporating said clear solution under vacuum and under a temperature not exceeding the temperature of 50° C. to obtain a residue, boiling said residue with alcohol, cooling and filtering the undissolved glucosides and separating them from the free anthocyanidins, organic acids and resins which remain dissolved in the alcohol.

References Cited by the Examiner
UNITED STATES PATENTS

| | | | |
|---|---|---|---|
| 2,233,251 | 2/1941 | Draghi | 195—98 |
| 2,273,196 | 2/1942 | Hesse | 260—210 |
| 2,281,392 | 4/1942 | Smead et al. | 195—32 |
| 2,388,840 | 11/1945 | Fulmer et al. | 195—38 |
| 2,798,025 | 7/1957 | Spensley | 195—32 |
| 2,798,026 | 7/1957 | Cash et al. | 195—101 |
| 2,832,688 | 4/1958 | Huang et al. | 99—106 |
| 2,951,073 | 8/1960 | Kranen-Fiedler | 260—210 |
| 3,012,943 | 12/1961 | Morse | 195—2 |
| 3,031,382 | 4/1962 | Knight | 195—101 |

OTHER REFERENCES

Amerine et al.: Commercial Production of Table Wines, Univ. of California Experiment Station Bulletin 639, pages 45 to 50 and 94 to 96, July 1940. (Copy in 99–35).

Chemical Abstracts, vol. 47, p. 12375h, 1953.

A. LOUIS MONACELL, *Primary Examiner.*

LEWIS GOTTS, *Examiner.*

J. R. GENTRY, A. E. TANENHOLTZ,
*Assistant Examiners.*